United States Patent
Shkolnikov et al.

(10) Patent No.: US 9,894,020 B2
(45) Date of Patent: Feb. 13, 2018

(54) DELIVERY OF EMAIL MESSAGES WITH REPETITIVE ATTACHMENTS

(75) Inventors: Pavel Shkolnikov, Waterloo (CA); Dimitri Mostinski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1216 days.

(21) Appl. No.: 12/500,081

(22) Filed: Jul. 9, 2009

(65) Prior Publication Data
US 2010/0011077 A1 Jan. 14, 2010

Related U.S. Application Data

(60) Provisional application No. 61/079,223, filed on Jul. 9, 2008.

(51) Int. Cl.
*G06F 13/00* (2006.01)
*H04L 12/58* (2006.01)

(52) U.S. Cl.
CPC ............ *H04L 51/063* (2013.01); *H04L 51/38* (2013.01)

(58) Field of Classification Search
CPC . H04L 12/583; H04L 51/063; H04L 12/5895; H04L 12/584; H04L 51/08; H04L 51/38
USPC .......................... 709/230–236, 246, 204–206
See application file for complete search history.

(56) References Cited

U.S. PATENT DOCUMENTS

| | | | |
|---|---|---|---|
| 7,003,551 B2* | 2/2006 | Malik | 709/206 |
| 7,194,514 B1* | 3/2007 | Yen et al. | 709/206 |
| 7,376,702 B2* | 5/2008 | DeSalvo et al. | 709/206 |
| 7,444,382 B2* | 10/2008 | Malik | 709/206 |
| 7,908,332 B2* | 3/2011 | Malik | 709/206 |
| 8,086,719 B2* | 12/2011 | Ocampo | 709/223 |
| 2002/0010748 A1 | 1/2002 | Kobayashi | |
| 2002/0065892 A1* | 5/2002 | Malik | 709/206 |
| 2002/0103935 A1 | 8/2002 | Fishman | |
| 2003/0208546 A1 | 11/2003 | Desalvo | |
| 2004/0010543 A1* | 1/2004 | Grobman | G06F 17/30902 709/203 |
| 2006/0095527 A1* | 5/2006 | Malik | 709/206 |
| 2006/0218234 A1 | 9/2006 | Deng et al. | |
| 2008/0320103 A1* | 12/2008 | Martin et al. | 709/219 |
| 2009/0030997 A1* | 1/2009 | Malik | 709/206 |
| 2009/0210502 A1* | 8/2009 | Ocampo | 709/206 |

(Continued)

FOREIGN PATENT DOCUMENTS

WO 2006053950 5/2006

*Primary Examiner* — Kenneth R Coulter
(74) *Attorney, Agent, or Firm* — Ridout and Maybee LLP

(57) ABSTRACT

A method, server and system for the delivery of email messages with repetitive attachments. In one example embodiment, the method comprises determining a unique identifier for a content item that is referenced in an email message; determining, in dependence on the unique identifier, if an attachment corresponding to the content item is present in an attachment cache, and if a corresponding attachment is not present in the attachment cache then processing the content item to create the attachment and storing the attachment in the attachment cache identified by the unique identifier, and if the corresponding attachment is present in the attachment cache, then retrieving the corresponding attachment from the attachment cache; and sending the corresponding attachment to the mobile communications device.

19 Claims, 3 Drawing Sheets

(56) References Cited

U.S. PATENT DOCUMENTS

2009/0313348 A1\* 12/2009 Plestid ........................ 709/217
2011/0213853 A1\* 9/2011 Ocampo ............ H04L 12/5895
                                                                                         709/206

\* cited by examiner

DELIVERY OF EMAIL MESSAGES WITH REPETITIVE ATTACHMENTS

This application claims the benefit of and priority to U.S. provisional patent application Ser. No. 61/079,223 filed Jul. 9, 2008, the contents of which are incorporated herein by reference.

TECHNICAL FIELD

The present disclosure relates generally to communication systems and, more particularly to a method, server and system for the delivery of email messages, such as HTML-based email messages, to multiple recipients.

BACKGROUND

Email messages often have associated computer files or other content items including attachments such as images, or other computer files. Such content items may be transmitted with the e-mail message itself or may be referenced in the e-mail document using a Uniform Resource Identifier (URI) which identifies a content item such that it may be retrieved from a network such as the internet or some other source. Where attachments are referenced by an e-mail, the content must be obtained from an appropriate source prior to being displayed.

Email attachments are often processed before they are transmitted wirelessly to a handheld communication device. Such processing typically reduces the size of the attachments, relative to the size of the original content items. For example, images are often down-sampled using a transcoder to reduce their size.

Accordingly, prior to transmitting an attachment to a wireless communication device, content items may need to be retrieved and/or processed for transmission.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
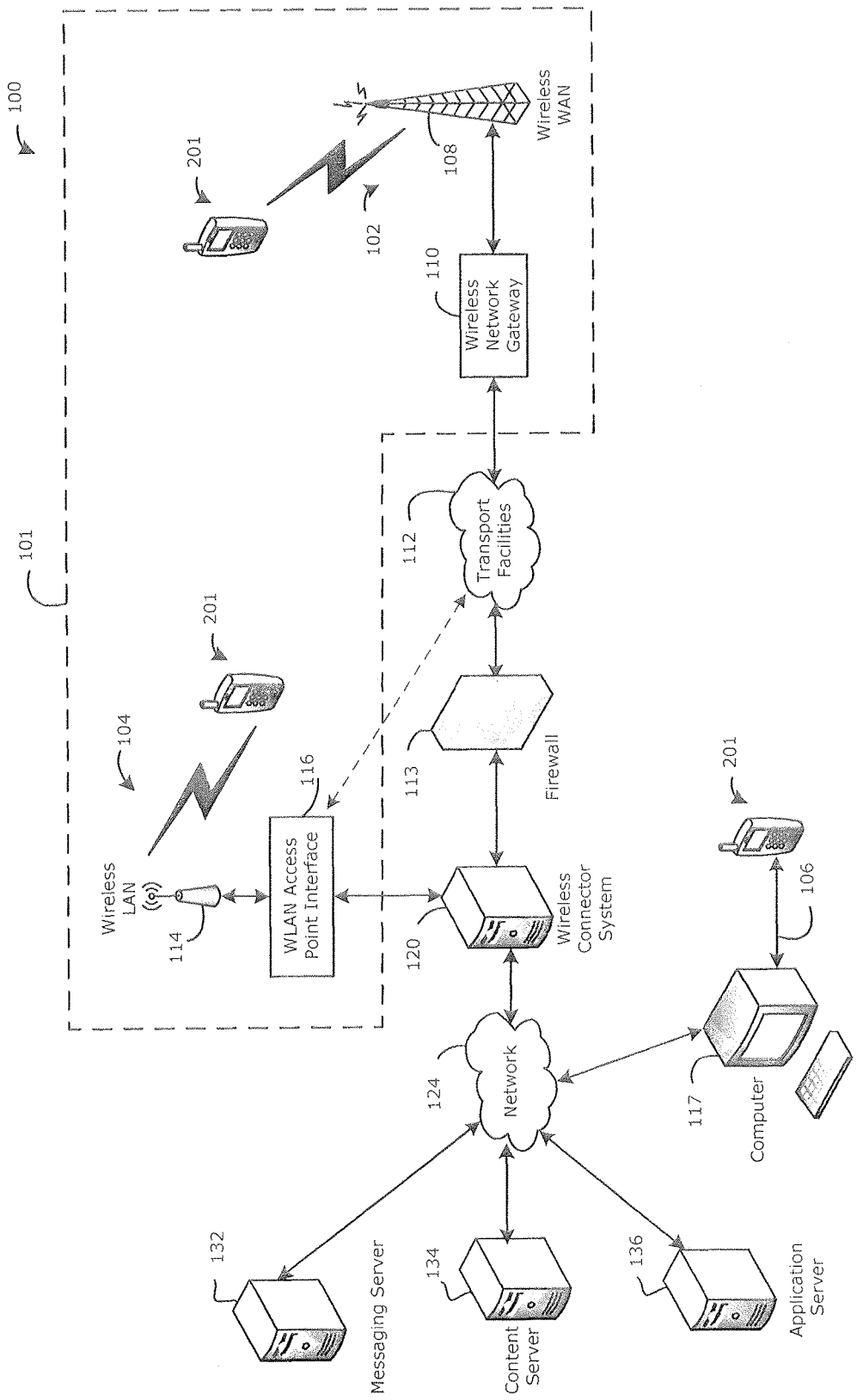
FIG. 1 is a block diagram illustrating a communication system including a mobile communication device to which system example embodiments of the present disclosure can be applied.

Email messages are often sent to multiple recipients that are serviced by a wireless connector system 120. As will be explained in greater detail below, methods and systems are provided which eliminate or reduce redundant processing of computer files associated with an email message when the email message is sent to multiple recipients. When the wireless connector system 120 receives an email message 364 for pushing to a mobile communication device 201, the wireless connector system 120 processes content items that are included as attachments in the original email message, and content items that may be referenced, but not included as attachments, in the original email message. The content items, may, but are not necessarily, stored as computer files, in the locations from which they are retrieved. As one example of this processing, when the wireless connector system 120 pushes an HTML email message to a mobile communication device 201, the wireless connector system 120 may receive or retrieve the content items 368 (such as image files) that are referenced by links in an HTML email message, adapt or convert the content items, then send a multipart message that includes the email message along with attachments that are the adapted versions of the linked content items. Converting a linked content item may include for example processing the content item so that it is more suitable for the wireless network that it is being sent through, or more suitable for the capabilities of the receiving mobile communication device, or both.

In the case where an HTML email message is sent to multiple recipients that are serviced by the wireless connector system 120, the wireless connector system 120 may end up processing the same email message 364 multiple times, and thus each of the content items that are referenced in the email get processed by the wireless connector system 120 multiple times. For example, retrieving and converting of the content items linked in an HTML message to provide inline content can be repeated multiple times, requiring resources at the wireless connector system 120. In example embodiments described herein, the email service 330 is configured to reduce the number of times linked content items need to be processed by the wireless connector system 120 to create attachments for an HTML email message that is addressed to multiple recipients. In example embodiments, the wireless connector system 120 is configured so that when sending an HTML email message to a first of multiple recipients, the wireless connector system 120 stores the attachments that it retrieves and otherwise processes for the email message in a cache 332 with a unique identifier so that the cached attachments can then be sent to each of the other recipients without the need for the wireless connector system 120 to re-retrieve or otherwise re-process each of the content items 368 that are linked in an HTML email.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange, IBM Lotus Domino, or Novell GroupWise email server), a content server 134 for providing content such as internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

In example embodiments, the mobile communication device 201 is a two-way communication device having at least data and possibly also voice communication capabilities, and the capability to communicate with other computer systems, for example, via the public internet. Depending on the functionality provided by the mobile communication device 201, in various embodiments the device may be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some embodiments, the mobile communication device 201 is a handheld electronic device which includes a rigid case (not shown) for housing components of the device 201 and is configured to be held with one or two hands while the device 201 is in use. In some embodiments, the handheld electronic device is small enough to fit inside a purse or coat pocket or belt mounted holster.

Figure 2:
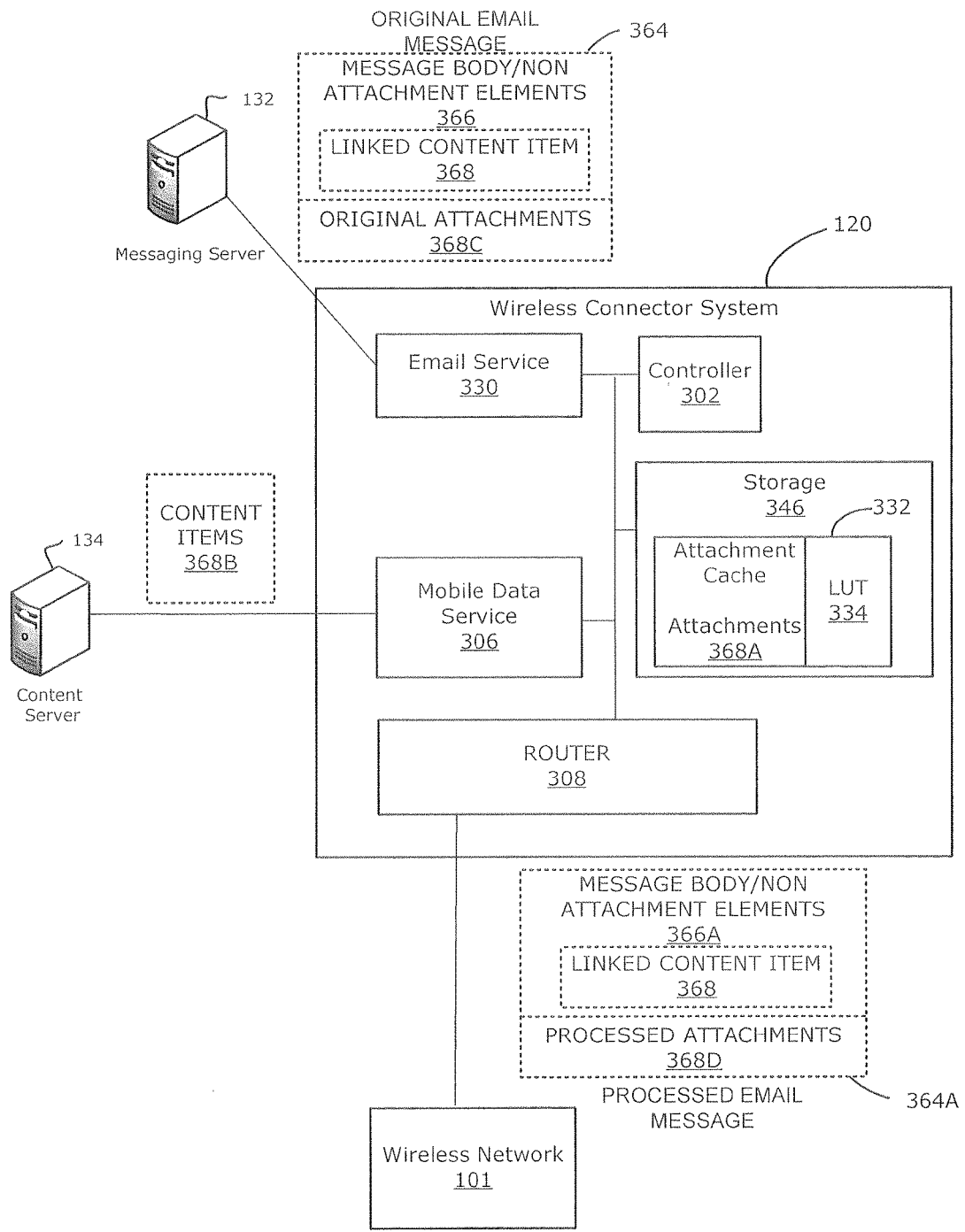
FIG. 2 is a block diagram illustrating a wireless connector system in accordance with one embodiment of the present disclosure.

Referring now to FIG. 2, the wireless connector system 120 for use in accordance with one embodiment of the present disclosure will now be described in more detail. The wireless connector system 120 may be implemented using any known general purpose computer technology, and may, for example be realized as one or more microprocessor based server computers implementing one or more server applications configured for performing the processes and functions described herein. The wireless connector system 120 is configured to implement a number of components or modules, including by way of non-limiting example, a controller 302, a mobile data service 306, a router 308 and an email service 330. The wireless connector system may include more of or fewer than the modules listed above. In one example embodiment, the wireless connector system 120 includes one or more microprocessors that operate under stored program control and execute software to implement these modules. The software may for example be stored in memory such as persistent memory.

Controller 302 monitors the various components or modules of the wireless connector system and restarts them if they stop working. The mobile data service 306 enables mobile communication devices 201 to access content available through content server 134, such as, but not limited to, web content, the internet, and an organization's intranet and content servers. Router 308 connects to the wireless network 101 to send data to and from mobile communication devices 201. Email service 330 connects to messaging server 132 to provide messaging services, including processing message attachments that are sent to mobile communication devices 201.

The controller 302, email service 330, mobile data service 306, and router 308 modules may, among other things, each be implemented through stand-alone software applications, or combined together in one or more software applications, or as part of another software application. In some embodiments, the functions performed by each of the above identified modules may be realized as a plurality of independent elements, rather than a single integrated element, and any one or more of these elements may be implemented as parts of other software applications.

Together with the other modules described above, the email service 330 configures the wireless connector system 120 to perform, at least in part, the functions of a mobile email server and in this regard the wireless connector system 120 receives email messages 364 from messaging server 132, processes the received email messages for sending to mobile communication devices 201 in wireless network 101, and then sends the processed email messages 364A to the recipient devices 201. In one example embodiment the wireless connector system 120 is configured for receiving HyperText Markup Language (HTML) formatted email messages 364, processing the email messages for delivery to one or more of the mobile communication devices 201, and sending the processed messages 364A to the destination mobile communication devices.

Email messages are often sent to multiple recipients that are serviced by the wireless connector system 120. As will be explained in greater detail below, methods and systems are provided which eliminate or reduce redundant processing of computer files associated with an email message when the email message is sent to multiple recipients. An email message such as a message in a form defined by Request For Comment (RFC) 822, comprises a header which includes a number of header lines or fields, and a message body. As defined in the MIME (Multipurpose internet Mail Extensions) standard, email messages may comprise multiple parts, including attachments, all of which can be sent together as a single message. This type of message is signalled by the term "multipart" in a MIME content-type header. Some email messages include content expressed in a formatting language, such as (without limitation), RTF or HTML. An HTML email message contains HTML content within the body of the message. The HTML content is located within an HTML portion of the message body, and may for example comprise an HTML head section and HTML body section. The HTML head section is denoted using the tags <head> and </head> to mark the start and end of the HTML head section, respectively. The HTML body section is denoted using the tags <body> and </body>to mark the start and end of the HTML body section, respectively. The body of an HTML email can refer to files, attachments, or the like (hereafter, "content items") that are to be included in the email message when it is displayed at a receiving device. For example, an HTML email can include a link to a file or other content item that includes inline content for the email, such as a .GIF file containing binary graphic image data, denoted for example by an <img> tag within an HTML body. The head section may also reference files, documents, or other objects, such as the document type definition ("DTD") or a cascading style sheet ("CSS") for example, which may include matter which is not explicitly displayed in an email or pushed to a mobile communication device 201 but which is necessary to correctly interpret or display message or attachment content, and therefore may affect what is pushed to the mobile communication device 201.

When the wireless connector system 120 receives an email message 364 for pushing to a mobile communication device 201, the wireless connector system 120 processes the content items that are included as attachments in the original email message, and the content items that may be referenced, but not included as attachments, in the original email message. The content items may be, but are not necessarily, stored as computer files, in the locations from which they are retrieved. As one example of this processing, when the wireless connector system 120 pushes an HTML email message to a mobile communication device 201, the wireless connector system 120 may receive or retrieve the content items 368 (such as image files) that are referenced by links in the HTML email message, adapt or convert the content items, then send a multipart message that includes the email message along with attachments that are the adapted versions of the linked content items. Converting a linked content item may include for example processing the content item so that it is more suitable for the wireless network that it is being sent through, or more suitable for the capabilities of the receiving mobile communication device, or both.

In the case where an HTML email message is sent to multiple recipients that are serviced by the wireless connector system 120, the wireless connector system 120 may end up processing the same email message 364 multiple times, and thus each of the content items that are referenced in the email get processed by the wireless connector system 120 multiple times. For example, retrieving and converting of the content items linked in an HTML message to provide inline content can be repeated multiple times, requiring resources at the wireless connector system 120. In example embodiments described herein, the email service 330 is configured to reduce the number of times linked content items need to be processed by the wireless connector system 120 to create attachments for an HTML email message that is addressed to multiple recipients. Referring to FIG. 2, in example embodiments, the wireless connector system 120 is configured so that when sending an HTML email message to a first of multiple recipients, the wireless connector system 120 stores the attachments that it retrieves and otherwise processes for the email message in a cache 332 with a unique identifier so that the cached attachments can then be sent to each of the other recipients without the need for the wireless connector system 120 to re-retrieve or otherwise re-process each of the content items 368 that are linked in an HTML email.

Figure 3:
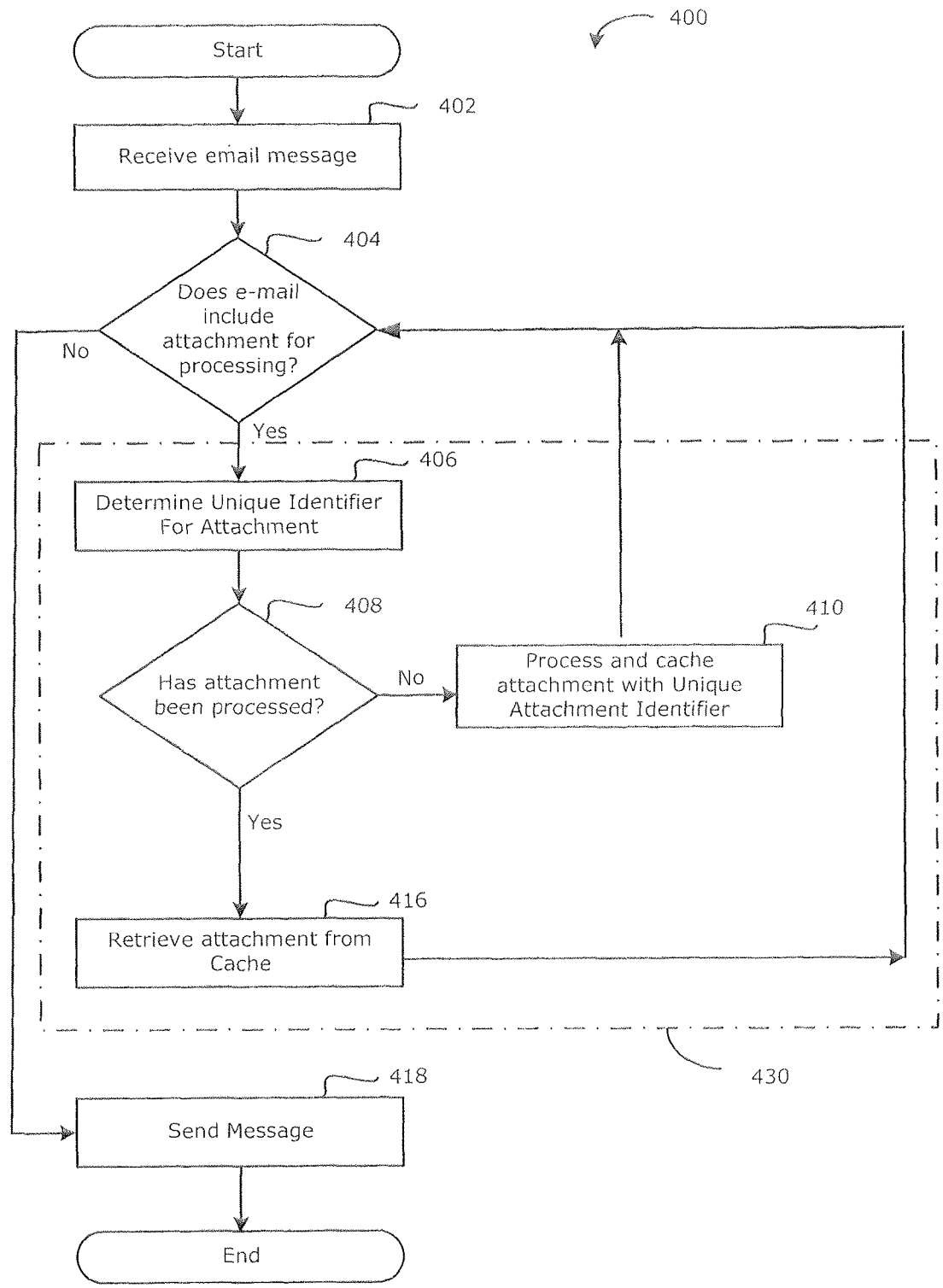
FIG. 3 is a flowchart illustrating a process for optimizing the delivery of email messages such as HTML-based email messages in accordance with one embodiment of the present disclosure.

An overview having been provided, reference is now made to FIG. 3 which illustrates operations 400 for optimizing the delivery of an email message to the mobile communication device 201 in accordance with one embodiment of the present disclosure. The operations 400 may be performed by the email service 330 of the wireless connector system 120. In other embodiments, the operations 400 may be performed by a separate server connected to the wireless connector system 120.

In a first step 402, an email message 364 (see FIG. 2) intended for one or more mobile communication device 201 is received by the wireless connector system 120. In one example embodiment, the message 364 is a multipart message that includes non-attachment elements 366, such as message header and message body elements, together with one or more associated content-item-bearing attachments 368c, which may, in some embodiments, be realized at some stages of message composition and processing, as computer files. The email message 364 may be an HTML email message. The email message is typically received by the wireless connector system 120 through the network 124 from a messaging server 132, such as a Microsoft Exchange messaging server, which may receive the email message from an email client, which may be a Personal Information Management (PIM) application such as the Microsoft Outlook email client, or from a mail transport agent, such as another messaging server (not shown) or an SMTP server (not shown). The email message may for example have originated from a computer or mobile communication device 201 connected to the transport facilities 112 (such as the public internet) or to the network 124. In some example embodiments, the content items 368 may not be immediately provided to the wireless connector system 120 with the non-attachment elements 366 of email message 364, but instead are referenced by location or an identifier, such that the wireless connector system must subsequently retrieve the relevant content items 368 from a remote location such as content items 368b stored on content server 134, when the received email message is processed by the wireless connector system 120 for sending to a recipient. Unless otherwise specified or required by context, operations 400 may be applied similarly to linked content items 368, whether the target of the link is an attachment 368c furnished with the original email, or is a file, document, or other resource 368b external to the original email that must therefore be retrieved in order that it may be transmitted to the recipient mobile communication device 201.

In a second step 404 a determination is made whether the email message 364 includes at least one associated content item 368 that must be processed by the wireless connector system 120 to provide a corresponding attachment 368D that will be sent out with or for the email message 364A by the wireless connector system 120 over the wireless network 101 to one or more mobile devices. In an example embodiment where operations 400 are performed in the context of an HTML email message, in step 404 the HTML email message body 366 is parsed to determine if the HTML email body includes a reference or link to at least one content item 368 that contains inline content—i.e., data to be presented as a part of the HTML email message. The linked or referenced content item may have been furnished as an original attachment 368C to email 364, or may be an externally-stored content item, such as content item 368B, that must be retrieved from a source, such as content server 134. Retrieval of the content item 368B from content server 134 is described as non-limiting example; the content item 368B may be stored at, and retrieved from, any other appropriate location, server, or resource. Although the example stated above relates to inline content for HTML email messages, in other example embodiments, operations 400 can be performed to process content items for non-inline content for HTML email messages, or for inline or non-inline content for non HTML messages, in which case step 404 would check for the presence of such content items for processing as the case may be.

In at least some example embodiments, the determination performed in step 404 is more rigorous than a simple presence test in that one or more characteristics of the content items 368 associated with an HTML email are evaluated to determine if the content items will processed and sent as attachments as part of the email message. For example, the size of a linked content item may be checked to determine if it exceeds a predetermined threshold, such that if the content item is too large it will not be sent as an attachment with the email message sent from the wireless connector system 120 and hence will not be counted in step 404 as an attachment.

In at least some example embodiments the type of content item 368 that is linked within an HTML email is considered when determining if that content item will result in an attachment that sent as part of the wireless email message. For example, some types of content items may not benefit from the processing done in operations 400 and thus will not be counted in step 404 as an attachment for the purpose of operations 400 even though such items may still be sent as attachments.

Thus, in at least some example embodiments, content items 368 that are associated with an email but which are not displayed as inline or embedded content are not considered as attachments that will be sent from the wireless connector system 120 and hence will not be counted in step 404 as content items that must be processed. By way of example, both text and HTML email messages commonly include attached files, documents, or other content items that are not associated with any inline or embedded content, in that such files or content items are not displayed as part of the email message but rather are sent as attachments that the user then has an option of opening (for example, an attached MS WORD™ document). In many wireless environments, attachments for unembedded or non-inline data are stripped out from an email before the email is wirelessly transmitted, with the user of the receiving device being given an option to subsequently download parts or all of the attachment if they want to. Accordingly, in one example embodiment, content items 368 that are for unembedded attachments to an email message are not counted as attachments that will be sent with an outgoing wireless email message in step 404. However, as suggested above in some example embodiments the wireless connector system 120 can be configured to send at least some content items that don't provide embedded or inline content, in which case such content items can be counted as attachments that need to be processed in step 404.

If a determination is made in step 404 that there are no content items 368 to be processed, the wireless connector system 120 will transmit the message 364A to the appropriate mobile communication device 201 as indicated in step 418. However, if the wireless connector system 120 determines that at least one content item 368 referenced by email message 364 is to be processed and sent as an attachment file 368D with the email message, a set of attachment processing operations 430 are performed for the subject content item 368. As indicated at step 406, as part of attachment processing operations 430, the wireless connector system 120 will proceed to determine a unique identifier for the content item 368. In one example embodiment, determining a unique identifier for the content item 368 is a two step process involving determining a unique message identity ("UMID") for the email message and determining an identity for the subject content item 368 based on how it is identified in the email message. In some embodiments, the UMID for the email message may be determined using a Message ID associated with the email message. The Message ID field is described in Network Working Group Request For Comments ("RFC") 822, which describes a de-facto standard for email messages. As described in RFC 822, the Message ID field contains an identifier which is used to uniquely identify a message. Each revision of a message contains a different identifier.

In some embodiments, the UMID of the message may be determined by other methods, including for example constructing a hash value from one or more of the Subject, From, To, CC, and/or Body fields of the email message. A hash function is a well defined procedure for turning data into a relatively small integer or string that, for practical purposes, uniquely identifies the data. The hash function takes a string of arbitrary length as input and produces a fixed length string or integer as an output. In some embodiments, the hash function may be a Secure Hash Algorithm (SHA) function. In at least some example embodiments, at least two of the fields noted above will be used to produce a hash value that uniquely identifies the email message. For example, in one embodiment, the data in the Body, Subject, and From fields are used to create a unique hash value.

With respect to determining an identity for the subject content item, such as content item 368, as described in RFC 2396 and RFC 3986, each unique content item 368 referenced in an HTML email message is identified by a Uniform Resource Identifier (URI). URIs are strings of characters that are used to identify or name a resource and may be absolute or relative. The unique identifier for each content item 368 is the message identity/content-item identity pair—for example the pairing of {UMID, URI} would identify the specific referenced content item 368 uniquely. It will be appreciated that other identifiers may be used to uniquely identify the content items.

Next, at step 408, the wireless connector system 120 determines whether the identified content item 368 has already been processed. In particular, in an example embodiment, the wireless connector system 120 is configured to maintain in a storage element 346 (FIG. 2) of the wireless connector system 120, which may include, for example storage provided by one or more of RAM or a hard disk drive or other type of digital data storage, an attachment cache 332 in which attachments 368A that have been previously processed by attachment processing operations 430 are stored. The attachments 368A that are stored in the attachment cache 332 are each identified by a unique attachment identifier that was determined for the attachment 368A during previous processing by operations 400. In particular, as will be described further below, the unique attachment identifier for an attachment 368A is the same as the unique identifier that was previously determined for the content item 368 from which the attachment 368A was derived during previous processing by operations 400. In an example embodiment, the unique attachment identifiers for the attachments 368A in the attachment cache 332 are stored in a list or table such as a look up table 334 in the storage element 346, with each unique attachment identifier pointing to or otherwise linking to its corresponding attachment 368A in the cache 332. Thus, by comparing the unique identifier determined in step 406 for a current content item 368 with the unique attachment identifiers for attachments 368A stored in the attachment cache 332, a quick determination can be made if a particular attachment 368A has already been cached for a specific content item 368 linked in the email message. If a cached attachment 368A with the same unique attachment identifier is stored in the attachment cache 332, a determination is made that the subject content item 368 was previously processed to generate the corresponding attachment file 368A. In some example embodiments the storage element 346 that the attachment cache 332 is stored in is a local in-memory storage of a server on which the email service is implemented. However, the cache could alternatively be located in a storage element that is remotely accessible to the wireless connector system 120 rather than in local storage.

In the case where the content item 368 has not already been processed, as indicated in step 410 the content item 368 is processed to create a corresponding processed attachment 368D for wireless transmission with the email message 364A, and a cache copy 368A of the processed attachment 368A is stored in the attachment cache 332 identified by a unique attachment identifier that is identical to the unique identifier that was created for the content item 368 in step 406. In some example embodiments, the content items 368 linked in the email message body 366 may not have been furnished to the wireless connector system 120 as original attachments 368C to the email message 364, but instead resides at an external or remote location, which may include without limitation messaging server 132, content server 134, application server 136, an external or internal web site, or some other storage facility or other server. In that case, processing the content item 368 associated with the email message 364 can include retrieving the associated content item 368B, which retrieval may optionally employ one or both of content server 134 and mobile data server 306. In some example embodiments, processing of the content item 368 alternatively or additionally includes converting it into a form which is more suitable for displaying on the mobile communication device 201 or which is more suitable for wireless transmission. For example, it may be desirable to perform processing steps on the content item 368 prior to transmitting the resulting attachment 368D to reduce its size in order to reduce the bandwidth required to transmit the attachment 368D or the amount of storage required for the attachment 368D at the mobile communication device 201. In the case of an image file, it may be desirable to reduce its resolution or otherwise convert its format, so that the resulting image data is formatted for display on the display screen of the mobile communication device 201, which is typically a relatively small screen on a device with limited processing resources. In some embodiments, the wireless connector system 120 includes a transcoder for down-sampling images. Where computer files are images, they may be down-sampled using the transcoder for display on the mobile communication device 201. In some embodiments, the step 410 of processing may include performing a virus check to ensure that the content items 368 are not infected with a computer virus. In some embodiments, an attachment size or type check may be performed in step 410 and the type of attachment processing done can be dependent on the size or type, for example. Other attachment processing functions may alternatively or additionally be performed in step 410.

The result of processing step 410 is a locally cached attachment 368A that is a version of the original content item 368. For example but without limitation, the attachment 368A may be stored in cache in the form of a conventional computer file, database records or other similar constructs, in-memory data structures, or in any other appropriate form. The degree to which the cached attachment 368A resembles the original content item 368 will depend on the extent of processing done in step 410. As noted above, the cached attachment 368A is uniquely identified in the attachment cache 332 by the unique identifier determined in step 406.

Turning again to step 408, in the case where a determination was made that the subject content item 368 had already been processed such that an attachment having an identical unique attachment identifier was already stored in attachment cache 332, the previously cached attachment 368A is retrieved from the attachment cache 332 without attachment processing step 410 being performed, as indicated in step 416.

In one example embodiment, after the attachment 368D is either created through processing step 410, or alternatively retrieved from attachment cache 332 through retrieval step 416, the attachment processing operations 430 are completed and operations 400 return to step 404 to determine if the email message 364 that is currently being processed by operations 400 includes reference to another content item 368 for processing. Thus, the attachment processing operations 430 are repeated for the email message 364 until: (i) in the case of an email message 364 that is being processed by operations 400 the first time, all content items 368 have been processed and the attachment cache 332 includes all the uniquely identified attachments 368A that are required for a assembling and sending the outgoing email message 364A that corresponds to the received email message 364, or (ii) in the case of an email that is being processed by operations 400 a second time, all the uniquely identified attachments 368D that are required for assembling and sending the outgoing email message 364A have been retrieved from the attachment cache 332.

As indicated in step 418, once all attachments 368A associated with the outgoing email message 364A have been either created or retrieved from the attachment cache 332 as the case may be, the email message 364A, including any attachments 368D, is sent to the mobile communication device 201 of an addressed recipient. Although operations 400 as shown in FIG. 3 suggests that the attachments 368D associated with a particular email message 364 are all retrieved or processed by attachment process operations 430 and then sent all together as part of the email message 364A, in other example embodiments one or more of the attachments 368D may be sent separately from each other or the non-attachment portions 366A of the email message 364A, in which case a send attachment step may be part of attachment process operations 430.

In some example embodiments, rather than include the retrieving step 416 as part of the attachment process operation 430, the retrieving of cached attachments 368A identified as previously processed in step 408 may be delayed for individual attachments 368A and then performed for all relevant attachments as part of send message step 418.

In some example embodiments, operations 400 are called by part of a larger email processing operation each time the wireless connector system 120 processes an email message, or in some cases a certain type of email message such as an HTML email message, for sending to a recipient mobile communication device 201 serviced by the wireless connector system 120. In cases where a particular email message 364 is addressed to multiple mobile communication devices 201 serviced by the wireless connector system 120, operations 400 may be called for each recipient mobile communication device, with the result that operations 400 will be called multiple times for the same email message 364. Accordingly, the attachment process operations 430 will be performed repeatedly until the email message 364 is processed for each addressed mobile communication device 201 that is served by the wireless connector system 120.

It will be thus appreciated that in at least some example embodiments, email service 330 operates such that when the wireless connector system 120 is required to send to multiple recipients an HTML email message that includes content items for inline content, the relevant content items will be processed once and the processed attachments cached so that they can be re-used. By uniquely mapping the attachments using an attachment identification protocol, the presence or absence of a suitable attachment in the cache can be efficiently determined. When a cached attachment is needed again, for example, when the email message is sent to subsequent recipients, one or more processing steps such as remote retrieval of the content item, or transcoding or other conversion operations can be avoided as the attachment can be identified and retrieved from an in-memory cache.

The operations shown in FIG. 3 can be modified in various alternative example embodiments. By way of example, in some embodiments, a check may be performed immediately upon receiving an email message if the message has multiple recipients served by the wireless connector system 120 and the caching operation terminated if a determination can be made that there are not multiple recipients. However, it will be noted that in addition to creating attachments 368A in cache 332 that can be retrieved when the same email message is sent to multiple recipients, operations 400 can also be used to create attachments 368A in cache 332 that can be retrieved when the same content items 368 are referenced multiple times in an email message that only has a single recipient,. Accordingly, operations 400 can reduce attachment processing requirements even for email messages that only have a single recipient but which reference the same content item 368 multiple times.

Furthermore, although in operations 400 the determination in step 408 as to whether a particular content item has already been processed is done on a content-item-by-content-item basis each time the email message is processed for a recipient, in other example embodiments a determination is made for the email as a whole by comparing the UMID for the email message with UMID's found in the cache, or by just looking in the cache for a processed attachment corresponding to the first content item. In such an example embodiment, once a determination is made that the email message has been previously processed, an assumption is made that all of the content items associated with the email message have been previously cached.

In some example embodiments, the attachments 368D that are actually sent to different mobile communication devices can be different for the same email message. For example, where one mobile communication device 201 is located in WWAN 102 and another mobile communication device 201 is located in WLAN 104, the content of the attachments 368D actually sent to each device may be different in view of the different network resources. Additionally, the attachments 368D sent to different devices can be different as the wireless connector system 120 is configured to process attachments according to the different capabilities of different receiving mobile communication devices. In such wireless connector system environments, the attachments 368A that are cached in attachment cache 332 may be at an intermediate stage of processing, with further processing done on the attachment to tailor it to the particular environment or capabilities of the particular mobile communication device as the email message is processed by the wireless connector system 120 for that particular mobile communication device. Alternatively, the UMID can include indicia which signifies by class the network type via which the mobile communication device is connected, or the class of mobile communication device, or both. Accordingly, in some example embodiments, in attachment process operations 430, attachment processing and caching can vary based on one or more of receiving device class or network class, with the unique attachment identifier including identification of the one or more of receiving device class or network class such that a cached attachment will only be retrieved and used for an email message going a class of network or device compatible with earlier processing of the cached attachment.

It will be appreciated that attachments 368A which are saved to the attachment cache 332 may be deleted in a variety of ways. For example, attachments 368A may be deleted from the memory after a predetermined period of time has elapsed. By way of example, the attachments may remain on the memory for a day before being deleted. In other embodiments, where the wireless connector system 120 determines which recipients are serviced by the wireless connector system 120, the wireless connector system 120 may delete the attachments after the attachments have been sent to the all of the users serviced by the wireless connector system 120. In yet further embodiments, the memory may have a fixed memory size which is reserved for storing attachments. Once the reserved memory is filled, or once it has an amount remaining which is less than a predetermined threshold, the memory may begin to delete a portion of its contents on a first in-first out basis. That is, the attachments which have been stored in the memory for the longest period of time, or alternatively those which have been least recently used, will be deleted first.

By storing attachments in, and retrieving attachments from the cache in the manner discussed above, the wireless connector system 120 can reduce unnecessary processing of attachments. According to at least one example embodiment, cache 332 is built as an in-memory cache in the wireless connector system 120 (which functions as a mobile email server) that maps a unique attachment identifier that includes a message identity/content-item identity pair {UMID; URI} to each attachment that is stored in the cache. In at least some configurations, this allows a reduction in the number of requests that the wireless connector system 120 has to make to obtain data for the attachments from a remote server. For example, if an email message is sent to several recipients whose mobile communication devices are served by the same wireless connector system 120, the server would add all attachments referenced in the HTML content of the email message to the cache upon processing the email for one of the users (for whom the email message happened to be processed first), and upon processing the email message for all other users, the wireless connector system would be able to retrieve the attachments from the cache.

In some example embodiments, the operations 400 may, when performing step 404, parse or analyze the email message 364 received by the wireless connector system 120 to determine if the message is a plain text (unformatted) email message, or an HTML formatted email message, and only apply attachment processing operations 430 to those email messages which are formatted using HTML. This determination may be made, for example, for a Multipurpose internet Mail Extensions (MIME) compliant email message by parsing the email message and analyzing it for an indication of whether the message contains HTML content. For example, HTML content may be detected if the message contains a content-type header with a value of text/html. Other indications of HTML content may also be used. As will be understood by persons skilled in the art, the MIME specification defines a series of headers for specifying attributes of an email message including the "content-type" header field (which specifies a type and subtype of the message content) and defines a set of transfer encodings, amongst many parameters for formatting email. The MIME specification is currently specified in six (6) Request for Comment (RFC) documents: RFC 2045, RFC 2046, RFC 2047, RFC 4288, RFC 4289 and RFC 2077; however the present disclosure is not limited to any particular version and is intended to cover all prior and future versions, revisions, supplements, additions and replacements to the MIME specification to the extent they are compatible with the teachings of the present disclosure, and to cover other email formats and specifications which may be formatted in accordance with HTML (for example, proprietary email message formats). The current HTML specification is 4.01; however the present disclosure is not limited to any particular version and is intended to cover all prior and future versions, revisions, supplements, additions and replacements to the HTML specification to the extent they are compatible with the teachings of the present disclosure. The present disclosure can also be applied to other types of email messages in various example embodiments including non-HTML, non-MIME and non-RFC-822 email.

Although the email attachment caching and retrieval operations described above in connection with operations 400 have been described primarily in the context of content items that include inline content for HTML messages and that are sent along as attachments with the email message to the recipient mobile communication device, operations 400 and the use of an attachment cache could also be applied to other types of email messaging requests handled by the wireless connector system 120, including for attachments that are referenced by but sent separately from an initial email message to a mobile communication device. For example, in order to conserve resources, only part of an email message may initially be sent to a mobile communications device. A user of the device viewing the email message may select a "more" option, resulting in a request for more of the email message to be sent to the mobile communications device. When processing an attachment for an inline display in response to such a request, attachment process operation 430 could be implemented to cache, with unique identities, the attachment or attachments that are created to reply to the request so that if multiple requests are made for more data in respect of the same email message, the attachments required to fulfill that request will have been cached, and redundant processing by the wireless connector system 120 is reduced. The multiple requests for the same attachments in such case could even be from the same mobile communications device at different times.

By way of further example, when processing a request from a mobile communication device to open an email attachment for separate display from the email message that references it (regardless of whether the message is a text or HTML message), the attachment process operation 430 could be implemented to cache, with unique identities, the attachment or attachments that are created to reply to the request. As a result, if multiple requests to open the attachments are made in respect of the same email message, the attachments required to fulfill that request are cached, and redundant processing by the wireless connector system 120 is reduced.

According to an example embodiment, this disclosure provides a method for optimizing the delivery of attachments for email messages to multiple mobile communication devices, the method comprising: receiving an email message for sending to multiple mobile communication devices within a wireless network, the email message referencing one or more content items; processing the one or more content items to provide one or more corresponding attachments and caching the one or more attachments; sending the one or more attachments to a first one of the mobile communication devices; and retrieving the one or more cached attachments and sending the retrieved one or more cached attachments to at least a further one of the mobile communication devices.

According to an example embodiment, this disclosure provides a method for delivering email message attachments to mobile communication devices in a wireless network, comprising (a) determining a unique identifier for a content item that is referenced in an email message; (b) determining, in dependence on the unique identifier, if an attachment corresponding to the referenced content item is present in an attachment cache, and (i.) if a corresponding attachment is not present in the attachment cache then processing the referenced content item to create the attachment and storing the attachment in the attachment cache identified by the unique identifier, and (ii.) if the corresponding attachment is present in the attachment cache, then retrieving the corresponding attachment from the attachment cache; and (c) sending the corresponding attachment to a mobile communication device.

In accordance with one embodiment of the present disclosure, there is provided a method for optimizing the delivery of email messages to mobile communication devices. The method includes: a) receiving an email message having at least one associated content item; b) determining from the email message an identifier related to the associated content item; c) determining if the content item has been previously processed; d) if the content item has not been previously processed, processing the content item to obtain an attachment and saving the processed attachment and the identifier to a memory; e) if the content item has been previously processed, retrieving the processed attachment from the memory using the identifier; and f) transmitting the processed attachment to the mobile communication device.

In accordance with another aspect of the present disclosure, there is provided a server for optimizing the delivery of email messages to mobile communication devices. The server includes memory for storing computer files and a controller connected to the memory. The controller has at least one processor for controlling the operation of the server. The server includes a communication subsystem connected to the controller for receiving and sending email messages to the mobile communication devices over a wireless network. The email message has at least one associated content item. The server also includes an email module connected to the controller and adapted to receive the email messages. The email module is configured to determine from the email message an identifier related to the associated content item and to determine if the content item has been previously processed, and to process the content item to obtain a processed attachment from the content item if the content item has not been previously processed. The email module is further configured to save the processed attachment and the identifier to the memory if the content item has not been previously processed. The email module is also configured to retrieve the processed attachment from the memory using the identifier if the email message has been previously processed.

In accordance with further embodiments of the present disclosure, there are provided a computer program product comprising a computer readable medium having stored thereon computer executable instructions comprising instructions for practising the methods of the application.

While the present disclosure is primarily described as a method, a person of ordinary skill in the art will understand that the present disclosure is also directed to various apparatus such as a mobile communication device and wireless connector system for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method, by a messaging server, for delivering email message attachments to mobile communications devices in a wireless network, comprising:
   determining a unique identifier for an attachment that is referenced in an email message, the unique identifier including a combination of a message identity and a content item identity, wherein the combination of the message identity and the content item identity is a unique message identity (UMID) and a Uniform Resource Identifier (URI) pair;
   determining, in dependence on the unique identifier, whether a processed attachment corresponding to the attachment that is referenced in an email message is present in a local attachment cache in a memory of the messaging server;
   when the processed attachment is not present in the local attachment cache, retrieving the attachment from a content server distinct from the messaging server, processing the attachment, storing the processed attachment in the local attachment cache, and sending an outgoing email including the processed attachment to a recipient; and
   when the processed attachment is present in the local attachment cache, retrieving the processed attachment from the local attachment cache and sending an outgoing email message including the processed attachment to a recipient.

2. The method of claim 1 wherein determining the unique identifier includes determining the message identity for the email message and determining the content item identity in dependence on the attachment referenced in the email message.

3. The method of claim 1 wherein the message identity is derived from a Message ID field of the email message.

4. The method of claim 1 wherein the message identity is derived from a predetermined hash function applied to a plurality of fields of the email message.

5. The method of claim 1 wherein the content item identity is derived from a URI used in the email message to reference the attachment.

6. The method of claim 1, wherein the email message is a HyperText Markup Language (HTML) email message, and the attachment is linked from a body of the email message.

7. The method of claim 1 wherein the unique identifier is determined at least partially in dependence on a class of the mobile communications device that the email message is to be sent to.

8. The method of claim 1 wherein the unique identifier is determined at least partially in dependence on a class of the network in which the mobile communications device that the email message is to be sent to is operating.

9. The method of claim 1, wherein processing the attachment comprises at least one of:
   converting the attachment to a form that is more suitable for transmission over a wireless network; or
   converting the attachment to a form that is more suitable for capabilities of the mobile communications device.

10. A messaging server comprising:
   a processor and a memory coupled to the processor, the processor being configured for:
      determining a unique identifier for an attachment that is referenced in an email message, the unique identifier including a combination of a message identity and a content item identity, wherein the combination of the message identity and the content item identity is a unique message identity (UMID) and a Uniform Resource Identifier (URI) pair;
      determining, in dependence on the unique identifier, whether a processed attachment corresponding to the attachment that is referenced in an email message is present in a local attachment cache in a memory of the messaging server;
      when the processed attachment is not present in the local attachment cache, retrieving the attachment from a content server distinct from the messaging server, processing the attachment, storing the processed attachment in the local attachment cache, and sending an outgoing email including the processed attachment to a recipient; and when the processed attachment is present in the local attachment cache, retrieving the processed attachment from the local attachment cache and sending an outgoing email message including the processed attachment to a recipient.

11. The messaging server of claim 10 wherein the system determines the unique identifier by determining the message identity for the email message and determining the content item identity in dependence on the attachment referenced in the email message.

12. The messaging server of claim 10 wherein the message identity is derived from a Message ID field of the email message.

13. The messaging server of claim 10 wherein the content item identity is derived from a URI used in the email message to reference the attachment.

14. The messaging server of claim 10 wherein the email message is a HyperText Markup Language (HTML) email message, and the attachment is linked from a body of the email message.

15. The messaging server of claim 10 wherein the unique identifier is determined at least partially in dependence on a class of the mobile communications device.

16. The messaging server of claim 10 wherein the unique identifier is determined at least partially in dependence on a class of the network in which the mobile communications device is operating.

17. The messaging server of claim 10, wherein processing the attachment comprises at least one of:
converting the attachment to a form that is more suitable for transmission over a wireless network; or
converting the attachment to a form that is more suitable for capabilities of the mobile communications device.

18. A non-transitory computer-readable storage medium containing computer-executable instructions that, when performed by a processor of a messaging server, cause the processor to:
determine a unique identifier for an attachment that is referenced in an email message, the unique identifier including a combination of a message identity and a content item identity, wherein the combination of the message identity and the content item identity is a unique message identity (UMID) and a Uniform Resource Identifier (URI) pair;
determine, in dependence on the unique identifier, whether a processed attachment corresponding to the attachment that is referenced in an email message is present in a local attachment cache in the memory of the messaging server;
when the processed attachment is not present in the local attachment cache, retrieve the attachment from a content server distinct form the messaging server, process the attachment, store the processed attachment in the local attachment cache, and send an outgoing email including the processed attachment to a recipient; and
when the processed attachment is present in the local attachment cache, retrieve the processed attachment from the local attachment cache and send an outgoing email message including the processed attachment to a recipient.

19. The non-transitory computer-readable storage medium of claim 18, wherein processing the attachment comprises at least one of:
converting the attachment to a form that is more suitable for transmission over a wireless network; or
converting the attachment to a form that is more suitable for capabilities of the mobile communications device.

* * * * *